(12) United States Patent
Salles et al.

(10) Patent No.: US 7,392,136 B2
(45) Date of Patent: Jun. 24, 2008

(54) USE OF THE STATIONARY STATE OF ENERGY-EXCHANGING CELLULAR AUTOMATA FOR MODELLING SEDIMENTARY ARCHITECTURES

(75) Inventors: Tristan Salles, Paris (FR); Simon Lopez, Paris (FR); Philippe Joseph, Marly-le-Roi (FR); Marie Christine Cacas, Rueil-Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 11/688,922

(22) Filed: Mar. 21, 2007

(65) Prior Publication Data

US 2007/0288168 A1    Dec. 13, 2007

(30) Foreign Application Priority Data

Mar. 24, 2006    (FR) .................................. 06 02593

(51) Int. Cl.
 *G01V 9/02*    (2006.01)
(52) U.S. Cl. ..................... 702/2; 702/12; 703/9; 703/10
(58) Field of Classification Search ..................... 702/2, 702/5, 7, 12, 13; 703/9, 10
See application file for complete search history.

(56) References Cited

FOREIGN PATENT DOCUMENTS

EP       1 435 527 A       7/2004

OTHER PUBLICATIONS

Bradford, S. and Katopodes, N. (1999), "*Hydrodynamics of Turbid Underflows: Forumlation and Numerical Analysis*", Journal of Hydraulic Engineering, 125(10):1006-1015.
Hugot, A., Zaleski, S. and Joseph, P. (2000), "*Phenomenological Modeling of Catastrophic Dilute Gravity Flows*", Oil & Gas Science and Technology-Rev. IFP, vol. 55, No. 5, p. 471-483.
Das, H., Imran, J., and Mohrig, D. (2004), "*Numerical Modeling of Flow and Bed Evolution in Meandering Submarine Channels*", Journal of Geophysical Research, 109.
Parker, G., Fukushima, Y., and Pantin, H. (1986), "*Self-Accelerating Turbidity Currents*", Journal of Fluid Mechanics, 171:145-181.), 1986.
Parker, G., Fukushima, Y., and Yu, W. in *Journal of Hydraulics Research*, 25(1): 123-147, 1987.

Primary Examiner—Donald E McElheny, Jr.
(74) Attorney, Agent, or Firm—Antonelli, Terry, Stout & Kraus, LLP.

(57) ABSTRACT

The invention allows construction of the architecture of sedimentary layers deposited on a topographic surface as a result of the passage of sedimentary currents, using cellular automata. The topographic surface is discretized into a set of cellular automata. Then, for each current and each automaton, a stationary physical state resulting from an iterative process wherein intermediate physical states are constructed by material and energy exchanges between the automata is determined. These automata are thus constructed so as to be representative of the action of the sedimentary currents on the construction of the sedimentary architecture. A set of geologic variables allowing the architecture of the sedimentary layers to be reconstructed is thus deduced from these stationary physical states. Preferred fields of application of the method are oil exploration and production and reservoir characterization.

28 Claims, 4 Drawing Sheets

USE OF THE STATIONARY STATE OF ENERGY-EXCHANGING CELLULAR AUTOMATA FOR MODELLING SEDIMENTARY ARCHITECTURES

BACKGROUND OF THE INVENTION

1. Field of the Invention

The present invention relates to a method of reconstructing the architecture of sedimentary layers of a petroleum reservoir resulting from the passage of one or more sedimentary currents such as turbidity currents.

2. Description of the Prior Art

Figure 1:
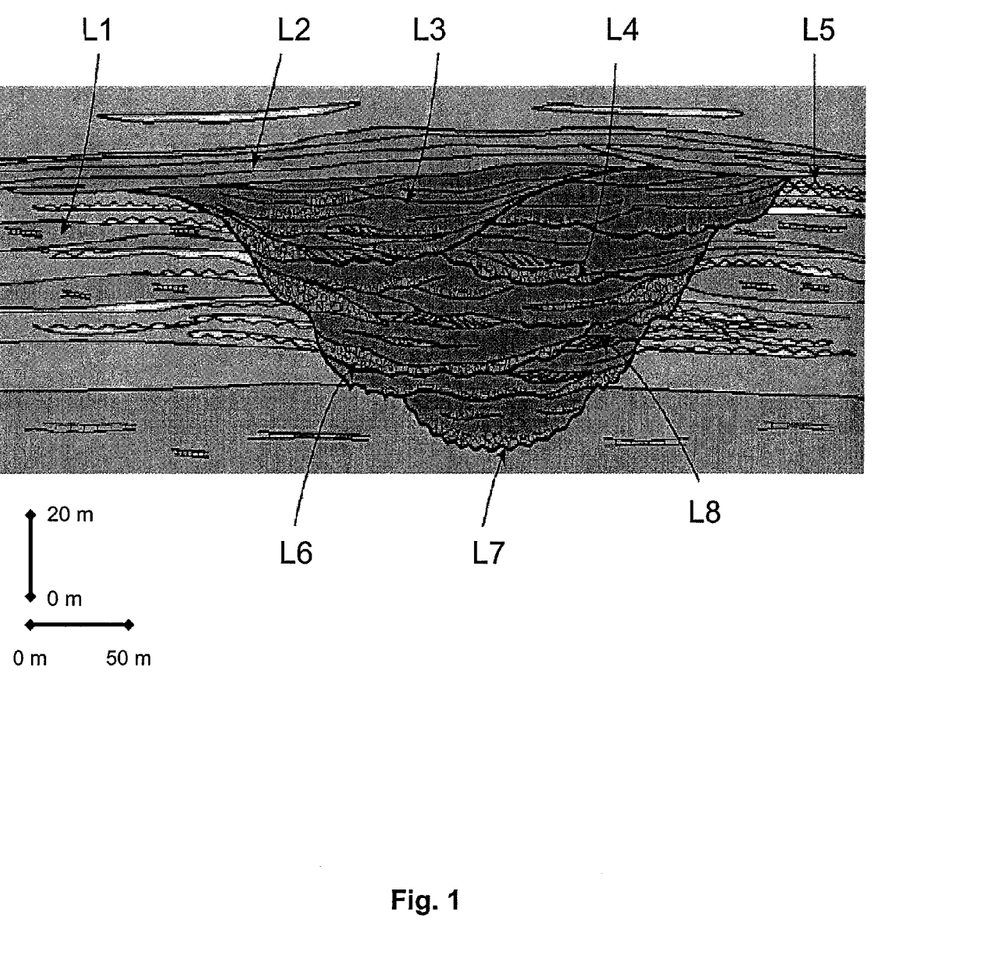
FIG. 1 is a diagrammatic geologic section of an outcrop of turbiditic deposits.

The petroleum industry, and more precisely exploration and development of petroleum reservoirs, requires the best possible knowledge of the underground geology to efficiently provide an evaluation of the reserves, modelling of the production or management of the development. In fact, determining the location of a production well or of an injection well, the parameters necessary for optimum hydrocarbon recovery, such as the injection pressure, the composition of the drilling mud, the completion characteristics, . . . , involves good knowledge of the reservoir. To know the reservoir means to know the subsoil characteristics at any point of space. This involves knowledge of the sedimentary architecture of this subsoil, that is definition of the geometry and of the nature of the geologic layers that make up this subsoil. FIG. 1 illustrates the sedimentary architecture of a reservoir example. It shows the diagrammatic geologic section of an outcrop of turbiditic deposits comprising eight lithologies (L1 to L8), and it illustrates the complexity of the sedimentary architectures to be simulated. Various intersecting surfaces due to the succession of filling and erosion processes can in particular be observed. This architecture cannot be observed, it results from the modelling of the various sedimentary events (marine or air sedimentary currents, desiccation, . . . ) that have affected the region studied. The geologic architecture thus defines various geological objects to which petrophysical properties can be assigned to improve the reservoir characterization and therefore the various evaluations.

The petroleum industry has been combining for a long time technical measurements and modellings performed in the laboratory and/or by softwares.

Petroleum reservoir modelling therefore is a technical stage that is essential to any reservoir exploration or development process. The goal thereof is to provide a description of the reservoir via its sedimentary architecture and/or its petrophysical properties.

SUMMARY OF THE INVENTION

The method according to the invention aims to reconstruct the architecture of sedimentary layers generated by one or more sedimentary currents such as turbidity currents.

Turbidity currents are density flows recognized as one of the main agents for the transfer of sediments on the ocean floor. The density difference, which is the driving force behind the displacement of these currents, is sustained by the presence of sediments suspended in the flow. This suspension, which makes the flow turbid, is itself sustained by the displacement of the current generating a high turbulence.

Despite an a priori simple working principle, the sedimentary heterogeneities observed in the deposits resulting from the passage of these flows (turbidites), like the architectures they generate, are still difficult to explain and to relate to physical processes. This lack of explanation is notably due to the difficulty in achieving in-situ measurements on modern systems. Characterization of these heterogeneities is however essential for the exploration and the development of petroleum reservoirs. It allows prediction of the location of the geological objects that are potentially reservoirs and those constituting permeability barriers according to their various petrophysical properties.

This characterization task is conventionally carried out statistically by inferring spatial laws from outcrop or subsurface data (well logs, cores, seismic). However, this approach only allows reproduction of a particular statistical distribution, and it does not allow an explanation or to wander therefrom. It nevertheless remains an operational alternative to the reductionist approaches intended to reproduce numerically, in an exhaustive manner, the physical processes for which the geologic time scale remains and should still remain for some time inaccessible.

By simplifying these physical laws to the spatial and time scales of the sedimentary basin, stratigraphic modelling, as described for example in U.S. Pat. No. 5,844,799, allows obtaining an average but realistic distribution of different lithologies. However, since it does not involve, among other things, inertial phenomena, it is unable to predict the sedimentary architecture of a petroleum reservoir in a detailed manner. In order to reach this detail level, most of the known approaches start from partial differential equations that are thereafter discretized using various numerical methods and schemes. An example thereof is mentioned by Bradford, S. and Katopodes, N. (1999), "*Hydrodynamics of Turbid Underflow: Formulation and Numerical Analysis*", Journal of Hydraulic Engineering, 125(10):1006-1015. These discretizations can take advantage of a clever grid as in Das, H., Imran, J., and Mohrig, D. (2004), "*Numerical Modeling of Flow and Bed Evolution in Meandering Submarine Channels*", Journal of Geophysical Research, 109. These discretizations can also be done on the scale of geometrical objects, for example according to Hugot, A., Zaleski, S. and Joseph, P. (2000), "*Phenomenological Modeling of Catastrophic Dilute Gravity Flows*", Oil & Gas Science and Technology-Rev. IFP, Vol. 55, No. 5, pp. 471-483.

However, these methods are not suited for deposit modelling on geologic time scales. On the contrary, they most often focus on the description of transient states instead of seeking a mean result, or they are restricted to the modelling of deposits in very specific environments, for example within channels.

The method according to the invention allows to simulate the construction of multilithologic sedimentary architectures linked with the passage of turbidity currents over geologic times, using cellular automata. In particular, a stationary behaviour is determined for each automaton, then the material and energy exchanges between these automata are modelled.

The present invention relates to a method for constructing the architecture of sedimentary layers deposited on a topographic surface as a result of the passage of at least one current carrying sedimentary materials. It comprises the following stages:

discretizing the topographic surface into a set of geometric patterns referred to as automata;

associating with each automaton a physical state, defined by physical parameters describing at least the carried materials, material exchange fluxes between the current and its environment, and an energy of the current;

determining, for each automaton, a stationary physical state resulting from an iterative process wherein intermediate physical states are constructed by material and energy exchanges between said automata;

determining, for each automaton and from the stationary physical state, at least one of the following geologic parameters: elevation of the topographic surface, thickness of the sedimentary materials deposited and eroded after passage of said current, sedimentary material volume concentration; and constructing for each automaton said sedimentary layers architecture from said geologic parameters.

According to the method, the iterative process can comprise the following stages:

a) calculating, for each automaton, according to the physical states of the automaton and of the neighboring automata, amounts of material and energy exchanged between these automata;

b) calculating a new physical state for each one of the automata according to the amounts of material and energy; and c) repeating the process from a) until the new physical state is identical to the physical state of a) to the nearest numerical value, the new physical state defining the stationary physical state.

In cases where the current carrying sedimentary materials is a turbidity current, the physical state of each automaton can comprise at least the following parameters:

a turbid fluid height above the automaton ($h_i$), a compositional description of the turbid fluid ($c_i$), an energy density ($e_i$), a turbulent energy density ($e_i^T$) sustaining the suspension of the carried materials, and mean material exchange fluxes between the turbidity current and its environment ($f_i$).

The material exchange fluxes can be determined from the following stages for each automaton:

estimating instantaneous material exchange fluxes;

determining mean erosion and deposition rates by averaging said instantaneous fluxes for a duration of said current; and calculating the material exchange fluxes from the mean erosion and deposition rates.

If the sedimentary materials have sets of different macroscopic characters, that is they have different lithologies, the sedimentary material volume concentrations and the material exchange fluxes are determined for each one of these lithologies.

Finally, if the number of currents is strictly greater than one, these currents are processed in chronological order.

BRIEF DESCRIPTION OF THE DRAWINGS

Other features and advantages of the method according to the invention will be clear from reading the description hereafter of non limitative embodiment examples, with reference to the accompanying figures wherein.

DETAILED DESCRIPTION OF THE INVENTION

The present invention relates to a method for reconstructing the architecture of layers made up of sedimentary materials of different lithologies of a petroleum reservoir deposited by one or more sedimentary currents such as turbidity currents. What is referred to as lithology is all of the macroscopic characters of sedimentary materials (sediments), such as the mineralogic composition, the texture, the color, etc. A sedimentary current is a fluid (water, air) carrying solid particles, the sedimentary materials.

The method is based on the use of a tool called "cellular automaton". A cellular automaton is a discrete model. It is a grid of "cells" each one of which can take, at a given time, a finite number of "states". The time is also discrete and the state of a cell at the time t depends on the state, at the previous time, of a finite number of cells making up its "neighborhood". At each new unit of time, the same rules are applied for all the cells of the grid, producing a new "generation" of cells that entirely depends on the previous generation. The cellular automata technique is for example described in the following document:

Wolfram, S. (1996), "Theory and Applications of Cellular Automata", *Advanced Series on Complex Systems*, World Scientific.

Modelling is a technical stage that is essential for any petroleum reservoir exploration and/or development operation. The methodologies developed within this context, such as the method according to the invention, involve a series of technical stages that are often easier to describe by means of a mathematical formalism. Mathematical notations are thus used to define technical elements or parameters in order to describe the invention. For example, a cellular automaton is nothing but a discretization of a geologic surface (topography) internal to the reservoir, an event $\mathcal{E}^k$ corresponds to the passage of a turbidity current, ...

Thus, to facilitate the description, the following notations are used:

For any $i \in I$ the state of the automaton $C_i$ is characterized by:

$z_i$: elevation of the topography at the centre ($x_i, y_i$) of the automaton, $b_i$: sedimentary description of the substrate with $b_i = (b_i^k)_{k \in \{0,1, \ldots, K\}}$ and for $k \in \{1, \ldots, K\}$, $b_i^k = (d_i^k, (c_{i,l}^k)_{l \in \{1, \ldots, L\}})$ the sedimentary brick deposited by event $\mathcal{E}^k$ of thickness $d_i^k$ and of volume concentration (ratio of the volume of the carrying fluid stream to the flow rate in volume of the carried product) in sediment of lithology l, $c_{i,l}^k \in [0,1]$, and $b_i^0$ the sedimentary brick characterizing the initial state of the paleotopography, $h_i$: the height of turbid fluid above the automaton, $e_i$: the energy density of the automaton, sum of its potential energy density $e_i^P$ (linked with the presence of the suspended fluid) and of its kinetic energy density $e_i^K$, $e_i^T$: the turbulent energy density of the automaton, sustaining the suspension, $c_i$: $c_i = (c_{i,l})_{l \in \{1, \ldots, L\}}$ with $c_{i,l} \in [0,1]$ the volume concentration of the sediments of lithology l in suspension, L being the total number of lithologies. It allows determination of the compositional description of the turbid fluid, $E_i$: $E_i = (E_{i,G}, E_{i,l})_{l \in \{1, \ldots, L\}}$ the overall rate of erosion of the substrate with $E_{i,l}$ the flux of sedimentary material of lithology l eroded. It allows determination of the compositional description of the flux of sediments eroded and carried from the substrate to the suspension, $D_i$: $D_i=(D_{i,l})_{l \in \{1,\ldots,\mathcal{L}\}}$ with $D_{i,l}$ the flux of sedimentary material of lithology l deposited. It allows determination of the compositional description of the flux of sediments deposited, that is falling from the suspension onto the substrate, $w_i$: the rate of entrainment of the ambient fluid in the turbid suspension.

And for any $i \in I$, it is noted for each automaton:

$G_i=(z_i,b_i)$: the set of state variables allowing reconstruction of the architecture of the deposits from their altitude, their thickness and their sedimentary composition (the goal of the invention is to construct a value for these variables after the last event modelled), $f_i=(E_i,D_i,w_i)$: the material (water and sediments) exchange fluxes between the turbidity current and its environment, $\hat{P}_i=(h_i,e_i,e_i^T,c_i)$: the set of state variables characterizing the physics of the turbidity current running through automaton $C_i$. This set constitutes the physical state of the current, $P_i=(\hat{P}_i,f_i)$: the set of state variables characterizing the turbidity current and the interaction with its environment. This set constitutes the physical state of the automaton, referred to as physical state hereafter, $Q_i=(G_i,P_i)$: the set of state variables of automaton $C_i$, $Q=(Q_i)_{i \in I}$: the state of all of the automata, $G=(G_i)_{i \in I}$ the geology of the automata and $P=(P_i)_{i \in I}$ the physical state of the automata.

Let $(\mathcal{E}^k)_{k \in \{1,\ldots,K\}}$ be a set of successive sedimentary events with K the number of events; the method allows obtaining of the evolution and the resulting state of each automaton $C_i$ after events $\mathcal{E}^k$. The method can be broken up into five major stages:

1—Definition of an initial paleotopography
2—Construction of cellular automata
Then, for each sedimentary current $\mathcal{E}^k$:
3—Initialization of the physical state of the automata known for event $\mathcal{E}^k$
4—Determination of a stationary physical state for all the automata
5—Construction of the sedimentary architecture resulting from event $\mathcal{E}^k$ from the stationary state.

1—Definition of a Paleotopography

It is desired to model the evolution of a submarine topography due to the succession of sedimentary events during geologic times. The method is described within the context of a turbidity current, but any other sedimentary event, that is a sedimentary current comprising sedimentation and erosion phases, can be modelled within the scope of the invention. The surface corresponding to the submarine paleotopography just before the first event, as well as the lithologic composition of possible earlier deposits located beneath this surface (substrate), are determined by means of modellings based on data acquisition through direct or indirect measurements: logs, seismic surveys, cores, . . . These methods involve various techniques using inversion and reconstruction of the past sedimentary environments and geographies from the data available and they are always submitted to an expert (geologist, sedimentologist, . . . ).

Thus, the initial topography $(z_i^0)_{i \in I}$ and the initial nature of the substrate $(b_i^0)_{i \in I}$ are determined. The initial geology of the substrate characterized by $(G_i^0)_{i \in I}=(z_i^0,b_i^0)_{i \in I}$ is then known.

2—Construction of Cellular Automata

The surface corresponding to the initial paleotopography is discretized using a grid whose projection on a horizontal plane gives a regular two-dimensional plane grid. Then, by means of this plane grid, it is desired to model the evolution of this paleotopography due to the successive sedimentary events.

Let $(x_i,y_i)_{i \in I}$ be the set of nodes of the regular two-dimensional plane grid to which an altitude $(z_i^0)_{i \in I}$ is assigned so that the set of points $(M_i)_{i \in I}$ of respective coordinates $(x_i,y_i,z_i^0)_{i \in I}$ is an approximation of the paleotopography. On the horizontal projection plane, the dual grid of the previous regular grid defines a set of cells $(C_i)_{i \in I}$ of respective centers $(x_i,y_i)_{i \in I}$, all geometrically identical and thus constituting a tessellation (tessellation is the operation of paving a surface with a single pattern). These cells are referred to as automata hereafter. According to a preferred embodiment, the fact is exploited that the automata all have the same geometrical base to consider all the volume quantities as implicitly multiples of the area $\mathcal{A}_i=\mathcal{A}$ of this base. According to another embodiment, it is possible to keep the same method for automata with different areas and to involve each $\mathcal{A}_i$ in the calculation of the volume quantities.

3—Boundary Conditions

For each event $\mathcal{E}^k$ corresponding to the passage of a turbidity current, the duration of this event, denoted by $T^k$, is associated with $\mathcal{E}^k$.

A set of automata that can be anywhere in the modelled domain (limit of the domain defined by the paleotopography, well, . . . ) and for which data are available is defined. The subscripts assigned to these automata make up $I_k$, a non-empty subset of I. The known data can be conditions that are set at the boundaries of the domain, or values obtained at a well after logging surveys, laboratory surveys, . . .

These automata $(c_i)_{i \in I_k}$ thus define a subset of automata whose physical states $(P_i^k)_{i \in I_k}$ are known.

The method according to the invention, thus formulated by the various notations, allows determination of $Q^k$, the resulting state of all the automata after event $\mathcal{E}^k$, knowing their previous state $Q^{k-1}$. It is divided into two successive stages: seeking a stationary state for all of the automata and calculating the resulting state.

4—Determination of a Stationary Physical State for all the Automata

Principle

Passage of a turbidity current accumulates or erodes sediments in the course of time at a given point of a topography. The succession of the physical states of the turbidity current at the point considered and the interaction with its environment characterized by variables $h_i,e_i,e_i^T,c_i$ and $f_i$ (physical state of the automaton) could be modelled from a detailed physical model that is however costly in calculating time. According to the invention, it is not necessary to know all these transient states in order to obtain a realistic representation of the deposits resulting from the modelled event $\mathcal{E}^k$. Knowledge of a stationary state wherein the material and energy exchange between automata does not change their physical state correctly describes the interaction of the turbidity current with its environment on the geologic times scale. It is therefore this stationary state that is used to construct the sedimentary architecture resulting from event $\mathcal{E}^k$. The method, by determining a stationary state, thus spares continuous modelling of the sedimentary architecture.

To determine this stationary state, a sequence of physical states of the set of automata, denoted by $(P^{k,n})_{n \in \mathbb{N}}$, that converges to a limit $P_S^k$, is constructed by recurrence. Each one of these intermediate states corresponds to material and energy exchanges between the automata, but that do not change the geological state of the automata. In order to distinguish them from physical states having an impact on the sedimentary architecture, they are referred to as virtual physical states hereafter. These exchanges are performed until they no longer alter the physical state of the automata. The limit state $P_S^k$ thus obtained is the stationary physical state sought associated with event $\mathcal{E}^k$. It is therefore this state $P_S^k$ that is used to determine the geological state (sedimentary architecture) resulting from event $\mathcal{E}^k$.

Figure 2:
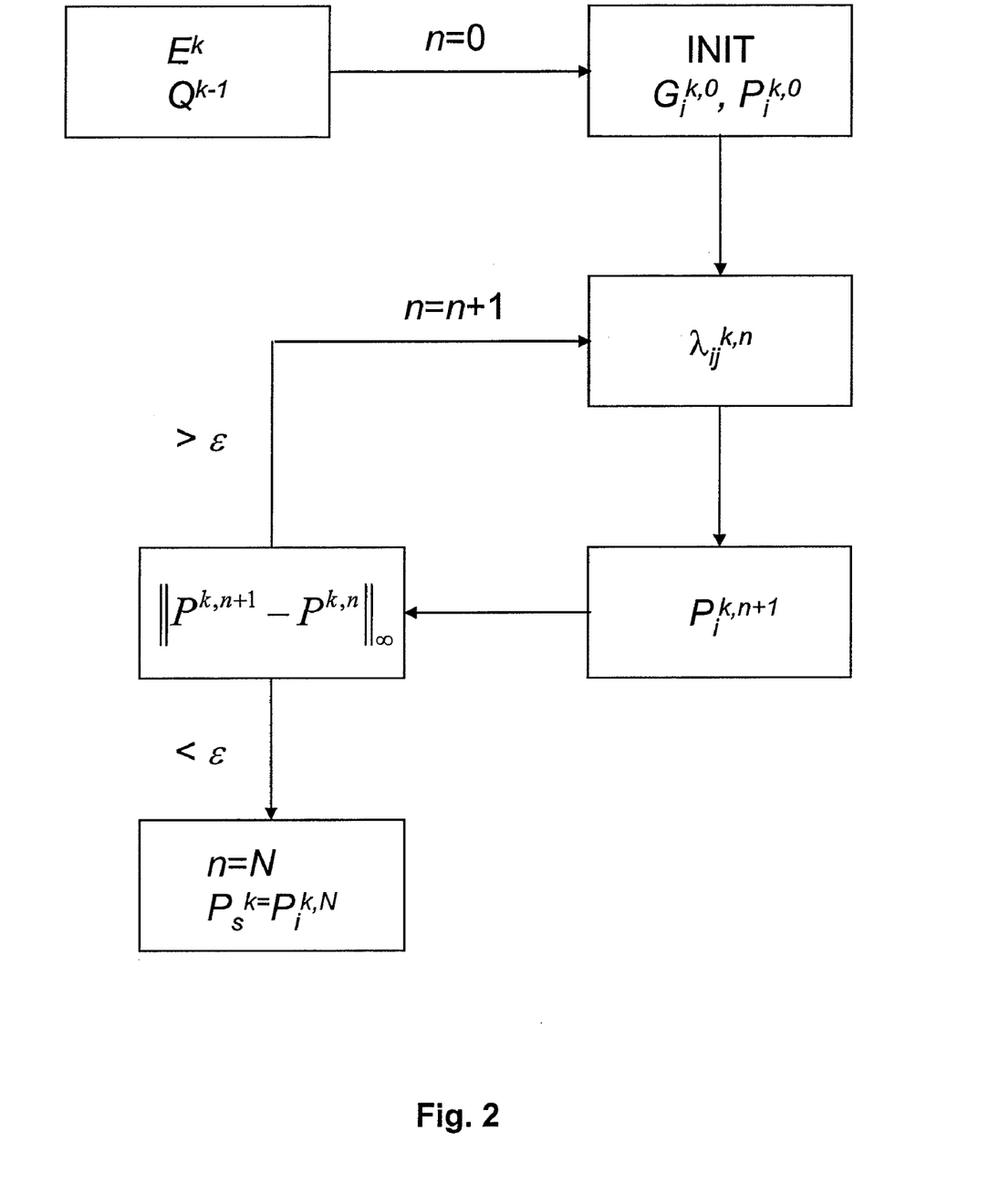
FIG. 2 is a flowchart illustrating the procedure used to calculate the stationary state of the automata associated with a given sedimentary event.

FIG. 2 is a flowchart illustrating the procedure used to calculate the stationary physical state of the automata associated with a given sedimentary event $\mathcal{E}^k$, knowing the prior state $Q^{k-1}=(Q_i^{k-1})_{i \in I}$:

a) initializing (INIT) the iterative process for n=0: $(G_i^0)_{i \in I}$ and $(P_i^{k,0})_{i \in I}$, b) calculating distribution coefficients $(\lambda_{ij}^{k,n})_{j \in L_i}$ that allow the material and the energy to be distributed;

c) distributing the material and the energy, and calculating a new physical state $(P_i^{k,n+1})_{i \in I}$;

d) checking that the physical state of the automata $(P_i^{k,n+1})_{i \in I}$ is stationary; and e) if the stationary state is not reached, repeating the process from b) by incrementing n:n=n+1.

Initialization of the Recurrence Process $J_k$ is the complement of $I_k$ in 1. The initial topography $(z_i^{k-1})_{i \in I}$ being known (initialization stage 1 or result of the modelling of event $\mathcal{E}^{k-1}$), as well as the initial nature of the substrate $(b_i^{k-1})_{i \in I}$, the geology of the substrate characterized by $(G_i^{k-1})_{i \in I}=(z_i^{k-1},b_i^{k-1})_{i \in I}$ is known. For the initial state of all the automata $Q^{k,0}=(Q_i^{k,0})_{i \in I}=(G_i^{k,0},P_i^{k,0})_{i \in I}$ with the states $(P_i^{k,0})_{i \in I_k}=(P_i^k)_{i \in I_k}$ that are given with event $\mathcal{E}^k$ and $(P_i^{k,0})_{i \in J_k}=(0)_{i \in J_k}$. This amounts to considering that, apart from the automata whose state is known for the modelled event $\mathcal{E}^k$, all the other automata $(C_i)_{i \in J_k}$ have the variables characterizing their physical state that are zero at the start of the recurrence seeking the stationary physical state: the height of turbid fluid above the automaton, the energetic state of the automaton (the energy density and the turbulent energy density of the automaton), the compositional description of the turbid fluid (volume concentrations of the suspended sediments by lithology), the material exchange fluxes (water and sedimentary materials).

In short:

for any $i \in I_k$, the states $P_i^{k,0}=P_i^k$ are given with event $\mathcal{E}^k$ (boundary conditions)

for any $i \in J_k$, we put $P_i^{k,0}=0$.

Recurrence Hypothesis

The virtual physical state $P^{k,n}=(P_i^{k,n})_{i \in I}$ of the automata is assumed to be known after iteration n in the search for the stationary state associated with event $\mathcal{E}^k$.

Let $K_i$ be the set of subscripts consisting of i and of the subscripts in l of the neighbors of automaton $C_i$. An automaton is the neighbour of another automaton when they are in contact.

Considering the virtual physical states $P^{k,n}=(P_i^{k,n})_{i \in I}$, the virtual physical states $P^{k,n+1}=(P_i^{k,n+1})_{i \in I}$ are now constructed. It is therefore assume that each automaton $C_i$ is likely to give to its neighbour $C_j$ ($j \in K_i$) a proportion $\lambda_{ij}^{k,n} \in [0,1]$ of the turbid fluid it contains, so that:

$$\sum_{j \in K_i} \lambda_{ij}^{k,n} = 1,$$

$\lambda_{ij}^{k,n}$ represents the proportion of turbid fluid kept by automaton $C_i$.

Figure 3:
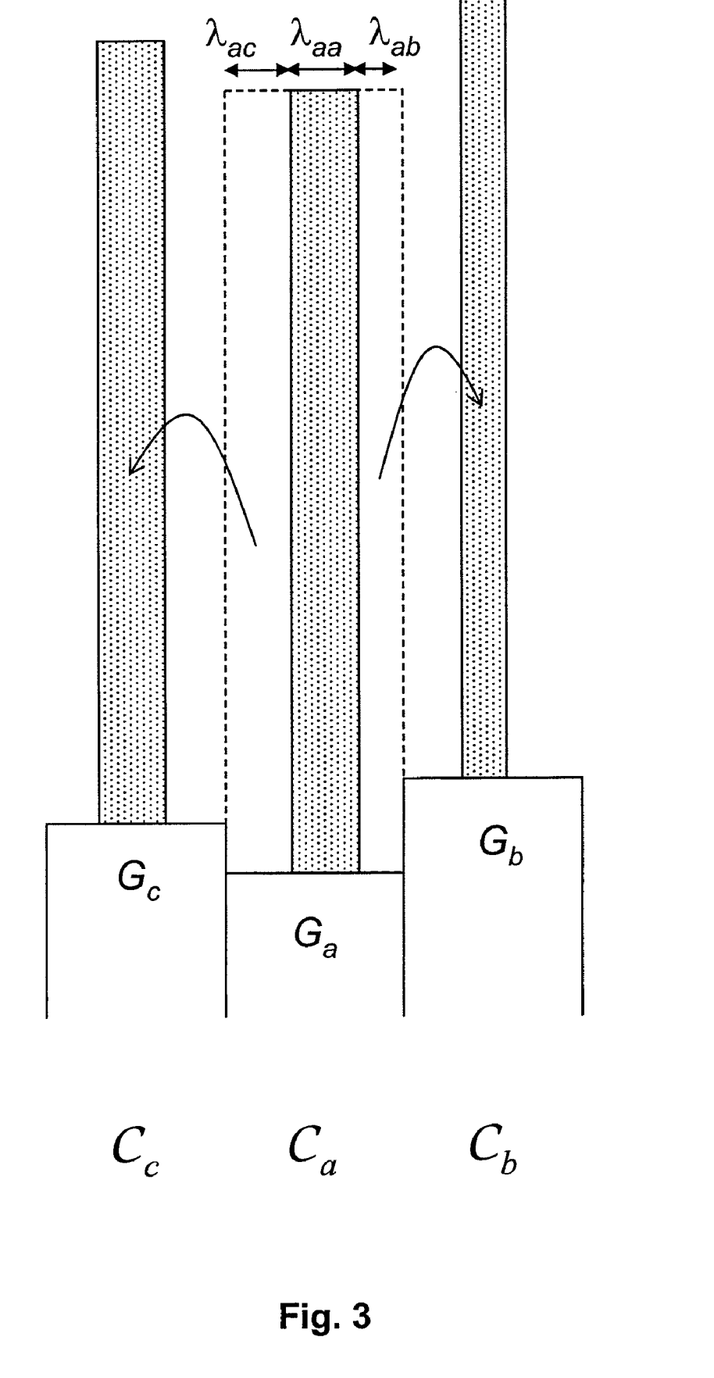
FIG. 3 illustrates the material and energy distribution between neighbouring automata.

These proportions are assumed to depend only on the state of the automaton considered and of its neighbors. The distribution $(\lambda_{ij}^{k,n})_{j \in K_i}$ is selected that minimizes work $$W_i = \sum_{j \in K_i} W_{ij}$$

with $W_{ij}$ the work performed by the force of gravity for passing the amount of fluid $\lambda_{ij}^{k,n} h_i$ from automaton $C_i$ to its neighbour $C_j$. Therefore, there is no effect caused by the directional bias exhibited by many cellular automata models (in particular those developed in fluviatile domains). FIG. 3 illustrates the distribution of material and energy between neighboring automata, wherein $G_a$, $G_b$ and $G_c$ represent the state of the substrate in each one of automata $C_a$, $C_b$ and $C_c$.

Automaton $C_a$:

gives the proportion $\lambda_{ab}$ of its material and of its energy to its right-hand neighbor $C_b$;

gives the proportion $\lambda_{ac}$ of its material and of its energy to its left-hand neighbor $C_c$; and keeps the proportion $\lambda_{aa}$ of its material and of its energy.

A different distribution allowing simulation of the hydrodynamic pressure linked with the kinetic energy can be obtained by replacing the height of fluid $h_i$ by the height $r_i$ obtained by considering that the energy of the automaton $h_i e_i$ is entirely of potential origin and linked with the superelevation of the column of turbid fluid by a height $r_i - h_i$.

Finally, it can be noted that other distribution choices $(\lambda_{ij}^{k,n})_{j \in K_i}$ can be considered, such as for example a distribution minimizing the experimental variance of the kinetic energy density on all of the automata $(C_j)_{j \in K_i}$.

Once distribution $(\lambda_{ij}^{k,n})_{j \in K_i}$ obtained, states $P_i^{k,n+1}$ are calculated by putting:

if $i \in I_k$, state $P_i^{k,n+1}=P_i^k$ is given with event $\mathcal{E}^k$, if $i \in J_k$, the state resulting from a fluid distribution between neighbors is calculated as follows:

Determination of $h_i^{k,n+1}$:

$$h_i^{k,n+1} = \lambda_{ii}^{k,n} h_i^{k,n} + \sum_{j \in K_i} \lambda_{ij}^{k,n}(h_j^{k,n} + w_j^{k,n}),$$

Determination of $e_i^{k,n+1}$:

$$h_i^{k,n+1} e_i^{k,n+1} = \lambda_{ii}^{k,n} h_i^{k,n} e_i^{k,n} + \sum_{j \in K_i} \lambda_{ij}^{k,n} h_j^{k,n}(e_j^{k,n} - \alpha e_j^{k,n})$$

with $\alpha$ the rate of transfer of the kinetic energy to the turbulent energy of the flow. This rate is an increasing function of the dimensions of the automaton characterized by $\sqrt{\mathcal{A}}$. The energy transfer allows here an inertial term to be introduced.

Determination of $e_i^{T\,k,n+1}$:

$$h_i^{k,n+1} e_i^{T,n+1} = \lambda_{ii}^{k,n} h_i^{k,n} e_i^{T,n} + \sum_{j \in K_i} \lambda_{ij}^{k,n} h_j^{k,n}(e_j^{T,n} + \alpha e_j^{k,n} - \varepsilon_j^{T,n})$$

with $\varepsilon_i^{T,k,n}$ the turbulent energy dissipated in automaton $C_i$ given by: $\varepsilon_i^{T,k,n} = \_0 e_i^{T,k,n} + W_i^S$ where $\_0$ is a viscosity dissipation rate and $W_i^S$ the work performed by the turbulence to maintain the feed suspended in the turbid flow and the incorporation of water (Parker, G., Fukushima, Y., and Pantin, H.

(1986), "Self-Accelerating Turbidity Currents.", Journal of Fluid Mechanics, 171:145-181.

Determination of $c_i^{k,n+1}$:

$$h_i^{k,n+1} c_i^{k,n+1} = \lambda_{ii}^{k,n} h_i^{k,n} c_i^{k,n} + \sum_{j \in K_i} \lambda_{ij}^{k,n} h_j^{k,n} (c_j^{k,n} + E_j^{k,n} - D_j^{k,n})$$

The method proposed is multilithologic and it takes account of the granulometric segregation.

It can be noted here that the distribution rules are such that the material flux terms $f_i^{k,n} = (E_i^{k,n}, D_i^{k,n}, w_i^{k,n})$ between an automaton and its environment are used only in the calculation of the amounts given up to its neighbors.

At this stage, it is thus known that $\hat{P}_i^{k,n+1} = (h_i^{k,n+1}, e_i^{k,n+1}, e^T{}_i^{k,n+1}, c_i^{k,n+1})$, the virtual physical state of the automaton without considering the interaction with its environment, that is the virtual physical state of the current.

The flux terms $f_i^{k,n+1}$ is then calculated from the physical state $(\hat{P}_i^{k,n+1})$ obtained above as follows:

The water fluxes carried by the turbulence to the vertex of the automaton and the eroded or deposited material fluxes at the interface with the substrate are then calculated. Conventional hydraulics formulas allow estimation for each lithology and each automaton the instantaneous water and sediment fluxes $\tilde{f}_i^{k,n+1}$ according to the virtual physical state ($\hat{P}_i^{k,n+1}$) of the current, the nature of the substrate characterized by its geology ($G_i^{k-1}$) that allows making of assumptions on its rheology. The original feature of the method calculates, from these instantaneous fluxes, the mean fluxes $f_i^{k,n+1}$, in particular the mean erosion and deposition rates of the automaton ($E_i^{k,n+1}, D_i^{k,n+1}$) that are obtained by averaging instantaneous rates $\tilde{f}_i^{k,n+1}$ over the duration $T_k$ of event $\mathcal{E}^k$. Once the mean fluxes known, the virtual physical state of the automaton $P_i^{k,n+1} = (\hat{P}_i^{k,n+1}, f_i^{k,n+1})$ is finally obtained.

The way these mean fluxes are calculated is detailed at the end of the description so as not to make the present description too heavy.

Recurrence Stop: Stationary State

The stationary physical state $P_S^k$ is obtained to the nearest numerical value, fixed by the experimenter and characterized by a number $\epsilon > 0$. The recurrence process is then stopped for $N > 0$ such that: $\|P_i^{k,N} - P_i^{k,N-1}\|_\infty < \epsilon$ and we put $P_S^k = P^{k,N}$. In practice, a fast convergence to stationary state $P_S^k$ is observed. This convergence can certainly be accelerated using conventional optimization methods to improve the recurrence procedure. One may for example consider using a preconditioning to obtain more rapidly the stationary state instead of obtaining it by means of a fixed-point method.

5—Construction of the sedimentary architecture resulting from the sedimentary Event from the Stationary State Once stationary physical state $P_S^k$ obtained, $P^k$ is set equal to $P_S^k$ and t then set $G^k$ of the state variables is constructed allowing reconstruction of the geology of the deposits from their altitude, their thickness and their sedimentary composition. Thus, state $Q^k$ of all the automata is totally determined. $G^k$ is defined by $z_i^k$ and $b_i^k$.

The sedimentary description of the substrate is defined by sedimentary brick $b_i^k$ deposited by event $\mathcal{E}^k$. This sedimentary brick is of thickness $d_i^k$ and of volume concentration in sediment of lithology 1 $c_{i,l}^k \in [0,1]$. The sedimentary bricks $(b_i^k)_{i \in I}$ representing event $\mathcal{E}^k$ are constructed from the mean erosion and deposition rates $(E_i^k, D_i^k)$ coming from physical state $P^k$, applied over duration $T_k$.

Erosion ($E_{i,G}^k > 0$)

In case of erosion in automaton $C_i$ ($E_{i,G}^k > 0$), the thickness $d_i^k$ of brick $b_i^k$ is zero and therefore: $d_i^k$ is set equal to 0.

The possible underlying bricks $(b_i^{k''})_{k'' < k}$ are modified accordingly to model the erosion by a height $E_{i,G}^k T^k$. If $\kappa_k$ is assigned to the shallowest brick not to be totally eroded, then:

For any $k' \in \{\kappa_k+1, \ldots, k\}$: $d_i^{k'} = 0$ and $c_i^{k'} = c_i^{\kappa_k}$, which amounts to giving as the composition value of the substrate the composition of the brick carried up to the surface by the erosion.

Finally, the topography of the substrate is updated by assigning to $z_i^k$, elevation of the topography at the center of the automaton, the value: $k_i^k = z_i^{k-1} - E_{i,G}^k T^k$.

Deposition ($E_{i,G}^k = 0$)

In case of deposition in automaton $C_i$ ($E_{i,G}^k = 0$), the possible underlying bricks $(b_i^{k''})_{k'' < k}$ are not modified. At the vertex of these bricks a new brick $b_i^k$ is constructed whose thickness is given by:

$$d_i^k = \frac{T^k \sum_{l=1}^{L} D_{i,l}^k}{1 - \gamma_i^k}$$

with $\gamma_i^k \in [0,1[$ the porosity of the brick determined according to the deposited sediments of lithology l characterized by $D_i^k$.

The compositional description of the brick is then updated by putting:

$$c_{i,l}^k = \frac{T^k D_{i,l}^k}{d_i^k}.$$

Finally, the topography of the substrate is updated by assigning to $z_i^k$, elevation of the topography at the centre of the automaton, the value: $z_i^k = z_i^{k-1} + d_i^k$.

It is important to note the multilithologic aspect taken into account in the method.

Figure 4:
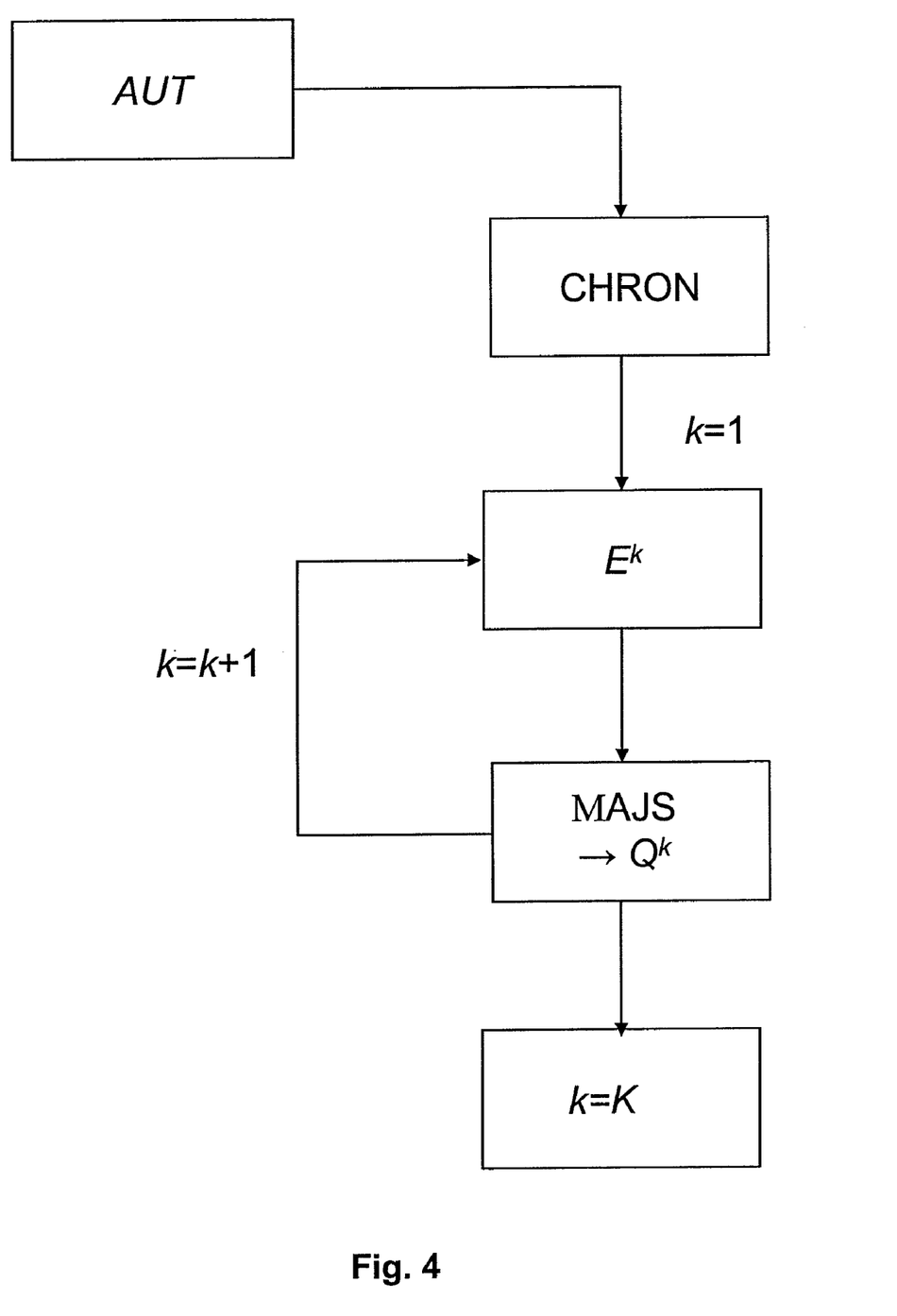
FIG. 4 is a flowchart illustrating the procedure used to simulate successive sedimentary events, once the spatial positioning of the cellular automata defined.

A method has been described for reconstructing the architecture of sedimentary layers of a petroleum reservoir resulting from a sedimentary event $\mathcal{E}^k$ such as a turbidity current. In order to take account of different sedimentary events, the method thus described just has to be successively applied for each event, in the chronological order linked with the various events. FIG. 4 is a flowchart illustrating the procedure used for simulating successive sedimentary events:

defining the cellular automata (AUT);

classifying the events in chronological order of occurrence (CHRON);

selecting the first event $\mathcal{E}^k$ with k=1;

updating the substrate after the erosion and deposition events of event E (MAJS); and repeating by processing the next event k=k+1.

This loop stops when all the events have been processed.

Description of the Instantaneous and Mean Fluxes Calculation

Calculation of the mean material fluxes from the calculation of the instantaneous fluxes is used when seeking a stationary state of the flow. In order to simplify the writing, all the notations are removed that refer to the event or to the rank of iteration in the stationary state seeking procedure. Finally, the subscript indicating the automaton considered is left out, the following remarks are made on a general basis for any automaton. With these conventions, $c=(c_l)_{l \in \{1,\ldots,L\}}$ designates for example the compositional description of the turbid fluid.

the following is set:

$\rho_w$ the density of the ambient fluid in which the turbidity current flows, in the present case salt water, hence a density of the order of 1030 g·l$^{-1}$, $\rho_l$ the density of the sediment of lithology l in suspension with $\rho_l > \rho_w$, g the acceleration due to gravity in m·s$^{-2}$, $$R_l = \frac{\rho_l}{\rho_w} - 1$$

with consequently $R_l > 0$, $$\rho_S = \rho_w \sum_{l=1}^{L} R_l c_l$$

the total apparent density of the suspended material obtained by subtracting the buoyancy, and $\rho_T = \rho_w + \rho_S$ the total density of the turbid fluid, comprising the density of the carrier fluid, salt water here, and the density of the suspended material.

Calculation of the Instantaneous Fluxes

For this type of calculation, see for example *Coastal Morphodynamics: Processes and Modelling*, a special issue of *Coastal Engineering* volume 21(1-3).

The potential energy density of an automaton of altitude z with a turbid fluid height h is given by:

$$e^P = \rho_S g \left( z + \frac{h}{2} \right)$$

The kinetic energy density $e^K$ is then deduced from the total energy density e of the automaton by:

$$e^K = e - e^P$$

Furthermore, by denoting by U the norm of the mean velocity of the turbid flow in the automaton considered, we also have:

$$e^K = \frac{1}{2} \rho_T U^2$$

The Richardson number of the flow is then expressed as follows:

$$Ri = \frac{\rho_S g h}{U^2}$$

and the instantaneous rate of entrainment of the ambient fluid can be approached by:

$$\tilde{w} = \frac{0{,}075}{\sqrt{1 + 718 Ri^2}}$$

This formulation can for example be found in "Experiments on Turbidity Currents Over an Erodible Bed" by Parker, G., Fukushima, Y., and Yu, W. in *Journal of Hydraulics Research*, 25(1):123-147, 1987. This entrainment rate can also be replaced by a mixing coefficient depending on the turbulent energy density of the automaton.

Then, the instantaneous deposition rate $\tilde{D}_l$ of the suspended sediments of lithology/is obtained by means of Krone's formula with:

$$\tilde{D}_l = c_l v_l^S \left( 1 - \frac{\tau_*}{\tau_l^d} \right)_+$$

where:

$v_l^S$ designates the rate at which the sediments of lithology l fall into the ambient fluid (the effects that may be due to the high concentrations or to the flocculation of the sediments of fine lithology are disregarded);

$\tau_*$ designates the "shear stress" exerted by the turbid flow on the substrate, this stress being mainly linked with the turbulence of the fluid;

$\tau_l^d$ designates the threshold stress above which the deposition of sediment of lithology l is not observed;

$(\cdot)_+$ designates the function $\begin{cases} \mathbb{R} \to \mathbb{R} \\ \cdot \mapsto \max(0, \cdot) \end{cases}$ Stress $\tau_*$ characterizing the effect of the flow on its substrate is obtained from the density of the turbid flow and an order of magnitude $u_*^2$ of the square of the fluctuations of the velocity of the flow close to the bottom linked with the turbulence. This order of magnitude is obtained from the turbulent energy density $e^T$ of the automaton. $u^2$ is set equal to $ae^T$, with conventionally $\alpha = 0{,}1$. Then: $\tau_* = \rho_T u_*^2$ i.e. $\tau_* = \alpha \rho_T e^T$.

Finally, the instantaneous erosion rate $E^{k,q}$ of the sedimentary brick representing the q-th event by the flow corresponding to event $\mathcal{E}^k$ is obtained as a function of the action of the flow on the substrate, characterized by $\tau_*$, and of the lithologic composition of this brick.

where $M^q$ and $\tau^{e,q}$ are parameters depending on the lithologic composition of the substrate with $\tau^{e,q}$ representing the threshold stress below which no erosion by the turbid flow is observed. A discussion of the value of parameters $M^q$ and $\tau^{e,q}$ can be found in the aforementioned document.

Assuming that sedimentary brick $b^q$ is being eroded, the instantaneous erosion rate $E_l^{k,q}$ of sediments of lithology l in the substrate is then given by:

$$E_l^{k,q} = c_l^q E_{hu\,k,q}$$

where $c_l^q$ is the volume concentration of sediments of lithology l in brick $b^q$.

The implementation of an active level of exchange between the substrate and the flow does not pose a particular problem. However it is chosen to merely assume the following inequality to be true:

$$\max_{l\in\{1,\ldots,L\}} \tau_l^d \leq \min_{q\in\{1,\ldots,k-1\}} \tau^{e,q}$$

This condition allows ensuring that $\mathcal{D}_l$ and $\mathcal{E}_l$ are not simultaneously non-zero.

Calculation of the Mean Fluxes

The mean rates of entrainment of the ambient fluid and of deposition of sediments of lithology l are taken equal to the instantaneous fluxes.

If $E^{k,k-1}$ the instantaneous rate of erosion of the upper brick at the time of event $\mathcal{E}^k$ is zero, the mean rate of erosion $E_l$ is taken zero for each sediment of lithology l, like the mean rate of overall erosion $E_G$.

If $E^{k,k-1}$ not zero, let $d^q$ be the thickness of sedimentary brick $b^q$, the time required for the flow corresponding to event $\mathcal{E}^k$ to erode brick $b^q$. If event $\mathcal{E}^k$ of duration $T^k$ is modelled, sedimentary bricks $(b_q)_{q\in\{0,\ldots,k-1\}}$ are therefore considered. We then seek the deepest brick that can be eroded by the current. To obtain this:

assuming that $d^0=\infty$ so that $\kappa_k \geq 0$. By denoting by $\delta^k$ the height of sediment eroded on the deepest brick by event $\mathcal{E}^k$, i.e.:

$$\delta^k = \tilde{E}^{k,\kappa_k}\left(T^k - \sum_{q=\kappa_k+1}^{k-1} t^{k,q}\right)$$

the total height $\Delta^k$ of sediment eroded by event $\mathcal{E}^k$ is then obtained by:

$$\Delta^k = \sum_{q=\kappa_k+1}^{k-1} d^q + \delta^k$$

The mean rate of overall erosion $E_G$ over the duration of event $\mathcal{E}^k$ is then given by:

$$E_G = \frac{\Delta^k}{T^k}$$

The mean rate of erosion $E_l$ of the layer of lithology l over the duration of event $\mathcal{E}^k$ is then given by:

$$E_l = \frac{\sum_{q=\kappa_k+1}^{k'-1} c_l^q d^q + \delta^k c_l^{\kappa_k}}{T^k}$$

Thus, the method according to the invention allows construction of the multilithologic sedimentary architecture linked with the passage of a turbidity current over geologic times, using stationary physical states of cellular automata exchanging material and energy. The method contains no directional bias as regards the sediment distribution rules.

By producing a realistic distribution of sedimentary facies, it allows better understanding of the layout of deposits for a more reliable prediction of the potential reserves during the exploration phase and better recovery thereof during the production stage. The invention also allows improving the resolution of stratigraphic modelling and it can take over from diffusive methods on the reservoir scale.

The advantages provided for the practice of engineering involve an improved positioning of the on-site measurements and tests from the representation of the spatial layout, the geometry and the variability of the geologic units on the basis of the sedimentary architecture and of the depositional environments.

The invention claimed is:

1. A method for constructing an architecture of sedimentary layers deposited on a topographic surface as a result of passage of at least one current carrying sedimentary material, comprising:

discretizing the topographic surface into a set of geometric patterns, the patterns being automata;

associating with each automaton a physical state, defined by physical parameters describing at least the at least one carried material, material exchange fluxes between the current, an environment of the current, and an energy of current;

determining, for each automaton, a stationary physical state resulting from an iterative process wherein intermediate physical states are constructed by material and energy exchanges between the automata;

determining, for each automaton and from the stationary physical state, at least one of the following geologic parameters: elevation of the topographic surface, thickness of the sedimentary materials deposited and eroded after passage of the current and sedimentary material volume concentration;

constructing for each automaton the architecture of the sedimentary layers from the geologic parameters.

2. A method as claimed in claim 1, wherein the iterative process comprises:

a) calculating, for each automaton, according to the physical states of the automaton and of automata, amounts of material and energy exchanged between the automation and neighboring automata;

b) calculating a new physical state for each one of the automata according to the amounts of material and energy; and c) repeating the process from a) until the new physical state is identical to the physical state of a) to a nearest numerical value, the new physical state defining the physical state.

3. A method as claimed in claim 1, wherein the current is a turbidity current.

4. A method as claimed in claim 3, wherein the physical state of each automaton comprises at least the following parameters:

a turbid fluid height above the automaton;
a compositional description of the turbid fluid;
an energy density;
a turbulent energy density sustaining the suspension of the carried materials; and
mean material exchange fluxes between the turbidity current and its environment.

5. A method as claimed in claim 1, wherein the material exchange fluxes are determined from the following stages for each automaton:

estimating instantaneous material exchange fluxes;
determining mean erosion and deposition rates by averaging the instantaneous fluxes for a duration of said current; and
calculating the material exchange fluxes from said mean erosion and deposition rates.

6. A method as claimed in claim 2, wherein, for sedimentary materials having different lithologies, volume concentrations in sedimentary materials and the material exchange fluxes are determined for each one of the lithologies.

7. A method as claimed in claim 1, wherein, for a number of currents greater than one, the currents are processed according to a chronological order thereof.

8. A method as claimed in claim 2, wherein the material exchange fluxes are determined from the following stages for each automaton:
   estimating instantaneous material exchange fluxes;
   determining mean erosion and deposition rates by averaging the instantaneous fluxes for a duration of said current; and
   calculating the material exchange fluxes from said mean erosion and deposition rates.

9. A method as claimed in claim 3, wherein the material exchange fluxes are determined from the following stages for each automaton:
   estimating instantaneous material exchange fluxes;
   determining mean erosion and deposition rates by averaging the instantaneous fluxes for a duration of said current; and
   calculating the material exchange fluxes from said mean erosion and deposition rates.

10. A method as claimed in claim 4, wherein the material exchange fluxes are determined from the following stages for each automaton:
    estimating instantaneous material exchange fluxes;
    determining mean erosion and deposition rates by averaging the instantaneous fluxes for a duration of said current; and
    calculating the material exchange fluxes from said mean erosion and deposition rates.

11. A method as claimed in claim 2 wherein, for the sedimentary materials having different lithologies, volume concentrations in sedimentary materials and the material exchange fluxes are determined for each one of the lithologies.

12. A method as claimed in claim 3 wherein, for the sedimentary materials having different lithologies, volume concentrations in sedimentary materials and the material exchange fluxes are determined for each one of the lithologies.

13. A method as claimed in claim 4 wherein, for the sedimentary materials having different lithologies, volume concentrations in sedimentary materials and the material exchange fluxes are determined for each one of the lithologies.

14. A method as claimed in claim 5 wherein, for the sedimentary materials having different lithologies, volume concentrations in sedimentary materials and the material exchange fluxes are determined for each one of the lithologies.

15. A method as claimed in claim 8 wherein, for the sedimentary materials having different lithologies, volume concentrations in sedimentary materials and the material exchange fluxes are determined for each one of the lithologies.

16. A method as claimed in claim 9 wherein, for the sedimentary materials having different lithologies, volume concentrations in sedimentary materials and the material exchange fluxes are determined for each one of the lithologies.

17. A method as claimed in claim 10 wherein, for the sedimentary materials having different lithologies, volume concentrations in sedimentary materials and the material exchange fluxes are determined for each one of the lithologies.

18. A method as claimed in claim 8 wherein, for a number of currents greater than one, the currents are processed according to a chronological order thereof.

19. A method as claimed in claim 9 wherein, for a number of currents greater than one, the currents are processed according to a chronological order thereof.

20. A method as claimed in claim 10 wherein, for a number of currents greater than one, the currents are processed according to a chronological order thereof.

21. A method as claimed in claim 11 wherein, for a number of currents greater than one, the currents are processed according to a chronological order thereof.

22. A method as claimed in claim 12 wherein, for a number of currents greater than one, the currents are processed according to a chronological order thereof.

23. A method as claimed in claim 13 wherein, for a number of currents greater than one, the currents are processed according to a chronological order thereof.

24. A method as claimed in claim 14 wherein, for a number of currents greater than one, the currents are processed according to a chronological order thereof.

25. A method as claimed in claim 15 wherein, for a number of currents greater than one, the currents are processed according to a chronological order thereof.

26. A method as claimed in claim 16 wherein, for a number of currents greater than one, the currents are processed according to a chronological order thereof.

27. A method as claimed in claim 17 wherein, for a number of currents greater than one, the currents are processed according to a chronological order thereof.

28. A method as claimed in claim 2, wherein the current is a turbidity current.

* * * * *